US012649855B2

(12) United States Patent
Okumura et al.

(10) Patent No.: US 12,649,855 B2
(45) Date of Patent: Jun. 9, 2026

(54) HYDROPHILIC TREATMENT COATING COMPOSITION AND A HYDROPHILIC TREATMENT METHOD

(71) Applicants: LIXIL Corporation, Tokyo (JP); NIPPON PAINT AUTOMOTIVE COATINGS CO., LTD., Osaka (JP)

(72) Inventors: Yoshihito Okumura, Tokyo (JP); Yusuke Nakashima, Tokyo (JP); Kazuki Yoshioka, Tokyo (JP); Takahito Nakase, Tokyo (JP); Yusuke Sato, Tokyo (JP); Hirotsugu Mano, Hirakata (JP); Yugo Takemoto, Hirakata (JP); Kiyoe Maejima, Hirakata (JP)

(73) Assignees: LIXIL CORPORATION, Tokyo (JP); NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 748 days.

(21) Appl. No.: 17/910,087

(22) PCT Filed: Mar. 12, 2021

(86) PCT No.: PCT/JP2021/010195
§ 371 (c)(1),
(2) Date: Sep. 8, 2022

(87) PCT Pub. No.: WO2021/182629
PCT Pub. Date: Sep. 16, 2021

(65) Prior Publication Data
US 2023/0113284 A1    Apr. 13, 2023

(30) Foreign Application Priority Data

Mar. 13, 2020    (JP) ................................ 2020-044430

(51) Int. Cl.
| | |
|---|---|
| *B32B 9/00* | (2006.01) |
| *C09D 5/16* | (2006.01) |
| *C09D 7/61* | (2018.01) |
| *C09D 141/00* | (2006.01) |
| *C09D 143/04* | (2006.01) |

(52) U.S. Cl.
CPC ............. *C09D 5/1618* (2013.01); *C09D 7/61* (2018.01); *C09D 141/00* (2013.01); *C09D 143/04* (2013.01)

(58) Field of Classification Search
CPC ....... C09D 7/61; C09D 143/04; C09D 141/00
USPC ....................................................... 428/408
See application file for complete search history.

(56) References Cited

U.S. PATENT DOCUMENTS

| | | | | |
|---|---|---|---|---|
| 2010/0159256 A1* | 6/2010 | Yamasaki | ............ | C09D 5/1637 |
| | | | | 524/588 |
| 2017/0174901 A1 | 6/2017 | Okumura et al. | | |

FOREIGN PATENT DOCUMENTS

| | | |
|---|---|---|
| CA | 2 979 194 | 9/2016 |
| JP | 8-27290 | 1/1996 |
| JP | 8-259270 | 10/1996 |
| JP | 2016-20461 | 2/2016 |
| JP | 2016-20462 | 2/2016 |
| WO | 2014-111745 | 1/2016 |
| WO | 2016/010100 | 1/2016 |
| WO | 2019/212718 | 11/2019 |

OTHER PUBLICATIONS

International Search Report (ISR) issued May 25, 2021 in International (PCT) Application No. PCT/JP2021/010195.
International Preliminary Report on Patentability and Written Opinion of the International Searching Authority issued Sep. 6, 2022 in International (PCT) Application No. PCT/JP2021/010195.
Office Action issued Jan. 2, 2026 in corresponding Indian Patent Application No. 202247051522.

* cited by examiner

*Primary Examiner* — Daniel H Miller
(74) *Attorney, Agent, or Firm* — Wenderoth, Lind & Ponack, L.L.P.

(57)    ABSTRACT

Provided is a hydrophilic treatment coating composition which imparts a soil guard property and is superior in durability of soil guard performance. Provided is a hydrophilic treatment coating composition for an inorganic substrate surface-treated with a silane coupling agent (S), comprising a hydrophilic compound (A) and a hydrophilic compound (B), wherein the hydrophilic compound (A) is a compound having at least one of a sulfonic acid group and an alkali metal salt of a sulfonic acid group, and the hydrophilic compound (B) is a compound having a quaternary ammonium cationic group.

16 Claims, No Drawings

HYDROPHILIC TREATMENT COATING COMPOSITION AND A HYDROPHILIC TREATMENT METHOD

TECHNICAL FIELD

The present invention relates to a hydrophilic treatment coating composition and a hydrophilic treatment method using the same.

BACKGROUND ART

Conventionally, for crockery and the like which are installed at a water-using site in a building, such as a toilet bowl and a washstand, various surface treatments are applied to make washing of surface soil easy.

Although not intended to wash a surface, there is proposed a method in which, in order to impart an antifogging property, an antifouling property, and the like to a glass product, a surface of a material mainly containing silicon oxide is treated with a silane coupling agent and then a reactive surfactant having a reactive group such as an acryloyl group or a vinyl group in the middle of a side chain or a hydrophobic group is allowed to react with that surface. A specific compound also is proposed. (See JP-A-8-259270 (Patent Literature 1).)

JP-A-2016-20461 (Patent Literature 2) discloses a composition that allows a surface layer containing an inorganic compound to react with a radical reactive functional group of a silane coupling agent after treatment of the surface layer with a silane coupling agent containing the radical reactive functional group. This composition comprises a hydrophilic compound containing a radical reactive functional group and an alkali metal salt of a sulfonic acid group and containing neither any hydrophilic portion other than ends of a molecular chain nor any branched chain, a radical polymerization initiator, and a polar compatibilizer. JP-A-2016-20462 (Patent Literature 3) discloses a composition that allows a surface layer containing an inorganic compound to react with a reactive functional group of a silane coupling agent after treatment of the surface layer with the silane coupling agent containing at least one reactive functional group selected from among an isocyanate group, an epoxy group, an amino group, and a mercapto group. This composition comprises a hydrophilic compound containing a radical reactive functional group and an alkali metal salt of a sulfonic acid group and containing neither any hydrophilic portion other than ends of a molecular chain nor any branched chain, and a polar compatibilizer.

CITATIONS LIST

Patent Literature

Patent Literature 1: JP-A-8-259270
Patent Literature 2: JP-A-2016-20461
Patent Literature 3: JP-A-2016-20462

SUMMARY OF INVENTION

Technical Problems

Since the compound disclosed in Patent Literature 1 has a branched chain structure, the hydrophilic portions are less likely to be concentrated on a surface. Therefore, there is a concern that even when the compound is used in crockery such as a toilet bowl and a washstand which are frequently subjected to washing with water, sufficient washability is not exhibited. Contrarily, a compound having no branched structure is easily crystallized because a hydrophilic group has high hydrophilicity. Therefore, even when this compound is used, it is difficult to uniformly hydrophilize the surface of crockery or the like.

Patent Literature 2 and 3 describe that when the hydrophilic treatment agents disclosed therein are used for crockery, such as a toilet bowl and a washstand, containing an inorganic compound such as silicon oxide, deposition of calcium and the like is prevented and it becomes easy to wash off oily soil that cause bacteria proliferation and odor. On the other hand, the crockery are often washed using a washing detergent in general homes, and various types of detergents are commercially available as washing detergents. As such a detergent, development of new products having a higher washing function is desired, and various new products have actually appeared. Hydrophilic treatment agents that can be used for the crockery are required to have superior durability even for various new washing detergents.

The present invention solves the above-described existing problems, and an object of the present invention is to provide a hydrophilic treatment coating composition and a hydrophilic treatment method which impart a soil guard property to an article to be coated such as crockery, and have superior durability of soil guard performance.

Solutions to Problems

In order to solve the above-described problems, the present invention provides the following embodiments.

[1]

A hydrophilic treatment coating composition for an inorganic substrate surface-treated with a silane coupling agent (S), comprising:

a hydrophilic compound (A) and a hydrophilic compound (B), wherein the hydrophilic compound (A) is a compound having at least one of a sulfonic acid group and an alkali metal salt of a sulfonic acid group, and the hydrophilic compound (B) is a compound having a quaternary ammonium cationic group.

[2]

A hydrophilic treatment coating composition for an inorganic substrate, comprising:

a silane coupling agent (S), a hydrophilic compound (A) and a hydrophilic compound (B), wherein the hydrophilic compound (A) is a compound having at least one of a sulfonic acid group and an alkali metal salt of a sulfonic acid group, and the hydrophilic compound (B) is a compound having a quaternary ammonium cationic group.

[3]

The hydrophilic treatment coating composition according to [1] or [2], wherein the silane coupling agent (S) has a radical reactive functional group ($R_S$), the hydrophilic compound (A) has a radical reactive functional group ($R_A$), the hydrophilic compound (B) has a radical reactive functional group ($R_B$), and the composition comprises a radical polymerization initiator.

[4]

The hydrophilic treatment coating composition according to [1] or [2], wherein the silane coupling agent (S) is a monofunctional group type silane coupling agent having one condensation type reactive functional group ($R_{S2}$), the hydrophilic compound (A) has a condensation type reactive functional group ($R_{A2}$), and the hydrophilic compound (B) has a condensation type reactive functional group ($R_{B2}$).

[5]

The hydrophilic treatment coating composition according to any one of [1] to [3], wherein at least one of the radical reactive functional groups ($R_A$) and (RH) of the hydrophilic compounds is at least one group selected from among an acrylamide group, an acryloyl group, a methacryloyl group, an allyl group, a vinyl group, a styryl group, and a mercapto group.

[6]

The hydrophilic treatment coating composition according to any one of [1] to [5], wherein the hydrophilic compound (A) does not have any hydrophilic portion other than ends of a molecular chain.

[7]

The hydrophilic treatment coating composition according to any one of [1] to [6], wherein the hydrophilic compound (B) does not have any hydrophilic portion other than ends of a molecular chain.

[8]

The hydrophilic treatment coating composition according to any one of [1] to [7], wherein the hydrophilic compound (A) has a number average molecular weight of 70 to 500, and the hydrophilic compound (B) has a number average molecular weight of 70 to 500.

[9]

The hydrophilic treatment coating composition according to any one of [3] and [5] to [8], wherein an average value of the number of carbon atoms existing between the radical reactive functional group ($R_A$) and the sulfonic acid group in the hydrophilic compound (A) is expressed by ($n_1$), an average value of the number of carbon atoms existing between the radical reactive functional group ($R_B$) and a quaternary ammonium cationic functional group in the hydrophilic compound (B) is expressed by ($n_2$), and the ($n_1$) and the ($n_2$) have a relationship of ($n_2$)>($n_1$).

[10]

The hydrophilic treatment coating composition according to any one of [4] and [6] to [8], wherein an average value of the number of carbon atoms existing between the condensation type reactive functional group ($R_{A2}$) and the sulfonic acid group in the hydrophilic compound (A) is expressed by ($n_{12}$), an average value of the number of carbon atoms existing between the condensation type reactive functional group ($R_{B2}$) and a quaternary ammonium cationic functional group in the hydrophilic compound (B) is expressed by ($n_{22}$), and the ($n_{12}$) and the ($n_{22}$) have a relationship of ($n_{22}$)>($n_{12}$).

[11]

A hydrophilic treatment coating composition set comprising:

the hydrophilic compound (A) and the hydrophilic compound (B) in the hydrophilic treatment coating composition according to any one of [1] to [10] being stored separately from each other.

[12]

A method of hydrophilic treatment of an inorganic substrate, the method comprising a step of surface-treating a surface of an inorganic substrate with a silane coupling agent (S); and a step of applying the hydrophilic treatment coating composition according to any one of [1] and [3] to [11] to the inorganic substrate treated with the silane coupling agent (S), and then making the silane coupling agent (S) react with at least one of the hydrophilic compound (A) and the hydrophilic compound (B) by light or heat.

[13]

A method of hydrophilic treatment of an inorganic substrate, the method comprising subjecting the hydrophilic treatment coating composition according to any one of [2] to [11] to light or heat to react the silane coupling agent (S) with at least one of the hydrophilic compound (A) and the hydrophilic compound (B), and applying the hydrophilic treatment coating composition after the reaction to a surface of an inorganic substrate.

[14]

A method of hydrophilic treatment of an inorganic substrate, the method comprising:

applying the hydrophilic treatment coating composition according to any one of [2] to [11] to a surface of an inorganic substrate, and making the silane coupling agent (S) react with at least one of the hydrophilic compound (A) and the hydrophilic compound (B) by light irradiation or heating.

[15]

The method of hydrophilic treatment of an inorganic substrate according to any one of [12] to [14], the method comprising making the silane coupling agent (S) react with at least one of the hydrophilic compound (A) and the hydrophilic compound (B) by light irradiation.

[16]

The method of hydrophilic treatment according to any one of [1] to [10], wherein the inorganic substrate is a sanitary crockery.

Advantageous Effects of Invention

By using the hydrophilic treatment coating composition, deposition of calcium or the like can be effectively prevented on crockery and the like, such as a toilet bowl and a washstand, which are installed at a water-using site in a building and contain an inorganic compound such as silicon oxide. The hydrophilic treatment coating composition further has an advantage of being superior in durability of such soil guard performance.

DESCRIPTION OF EMBODIMENTS

In the following, the hydrophilic treatment coating composition, the hydrophilic treatment coating composition set, and the hydrophilic treatment method will be described.

The hydrophilic treatment coating composition in the present description can be roughly classified into the following first embodiment and second embodiment.

First Embodiment

A hydrophilic treatment coating composition for an inorganic substrate surface-treated with a silane coupling agent (S), comprising:

a hydrophilic compound (A) and a hydrophilic compound (B), wherein the hydrophilic compound (A) is a compound having at least one of a sulfonic acid group and an alkali metal salt of a sulfonic acid group, and the hydrophilic compound (B) is a compound having a quaternary ammonium cationic group.

Second Embodiment

A hydrophilic treatment coating composition for an inorganic substrate, comprising:

a silane coupling agent (S), a hydrophilic compound (A) and a hydrophilic compound (B), wherein the hydrophilic compound (A) is a compound having at least one of a sulfonic acid group and an alkali metal salt of a sulfonic acid group, and the hydrophilic compound (B) is a compound having a quaternary ammonium cationic group.

In both the first embodiment and the second embodiment, the silane coupling agent (S), the hydrophilic compound (A), and the hydrophilic compound (B) are used. In the following, respective components are described.

Silane Coupling Agent (S)

The silane coupling agent (S) to be used in the hydrophilic treatment coating compositions is a compound having both a reactive silyl group and an organic functional group in the molecule. Examples of the reactive silyl group include a group that generates a silanol group by hydrolysis. Specific examples of the reactive silyl group include trialkoxysilyl groups (the number of the carbon atoms contained in each of the alkoxy groups is preferably 1 to 7) and dialkoxyalkyl groups (the number of the carbon atoms contained in each of the alkoxy groups is preferably 1 to 7, and the number of the carbon atoms contained in the alkyl group is preferably 1 to 7), and more specific examples include a trimethoxysilyl group, a triethoxysilyl group, a tripropoxysilyl group, a tris(2-methoxyethoxy)silyl group, dimethoxyalkylsilyl groups, diethoxyalkylsilyl groups, dipropoxyalkylsilyl groups, and bis(2-methoxyethoxy)alkylsilyl groups (the alkyl groups each may be a linear or branched alkyl group having 1 to 7 carbon atoms).

One example of the organic functional group is a radical reactive functional group ($R_S$). Examples of the radical reactive functional group ($R_S$) include an acrylamide group, an acryloyl group, a methacryloyl group, an allyl group, a vinyl group, a styryl group, and a mercapto group. Of these organic functional groups, only a single type may be contained or two or more types may be contained.

Another example of the organic functional group is a condensation type reactive functional group ($R_{S2}$). Examples of the condensation type reactive functional group ($R_{S2}$) include a carboxy group, a hydroxy group, an amino group, an epoxy group, a ureido group, an isocyanate group, and an isocyanurate group. Of these organic functional groups, only a single type may be contained or two or more types may be contained.

Specific examples of the silane coupling agent (S) include:

vinyltriethoxysilane, vinyltrimethoxysilane, vinyltris(2-methoxyethoxy)silane, vinylmethyldimethoxysilane, p-styryltrimethoxysilane, p-styryltriethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-mercaptopropylmethyldimethoxysilane, 3-mercaptopropyltrimethoxysilane, 3-mercaptopropyltriethoxysilane, 3-octanoylthio-1-propyltriethoxysilane, 3-aminopropyltriethoxysilane, 3-aminopropyltrimethoxysilane, N-(2-aminoethyl)-3-aminopropyltrimethoxysilane, N-(2-aminoethyl)-3-aminopropylmethyldimethoxysilane, 3-(N-phenyl)aminopropyltrimethoxysilane, 3-triethoxysilyl-N-(1,3-dimethyl-butylidene)propylamine, N-(vinylbenzyl)-2-aminoethyl-3-aminopropyltrimethoxysilane, 3-ureidopropyltriethoxysilane, 3-isocyanatopropyltriethoxysilane, 3-isocyanatopropyltrimethoxysilane, and tris-(trimethoxysilylpropyl)isocyanurate.

As the silane coupling agent (S), only one silane coupling agent may be used alone, or two or more silane coupling agents may be used in combination.

One example of the silane coupling agent (S) is an embodiment in which the silane coupling agent (S) has two or more radical reactive functional groups ($R_S$). In this embodiment, at least one radical reactive functional group ($R_S$) of the silane coupling agent (S) and the hydrophilic compound (A) have bondability, and further, at least one other radical reactive functional group ($R_S$) of the silane coupling agent (S) and the hydrophilic compound (B) have bondability. This makes it possible to effectively prevent a basic washing component such as a quaternary ammonium salt which may be contained in, for example, a commercially available detergent from being ionically bonded to sulfonic acids of the hydrophilic compound (A), leading to an advantage that durability of soil guard performance is more improved.

As the silane coupling agent (S), a commercially available product may also be used. As a commercially available product, for example, various silane coupling agents available from Shin-Etsu Chemical Co., Ltd., Momentive Performance Materials Inc., Toagosei Co., Ltd., Asahi Kasei Corp., etc. can be used.

It is considered that when the silane coupling agent (S) is used, a silanol group generated by hydrolysis of a reactive silyl group undergoes a bonding reaction to the surface of an inorganic substrate, which is a substrate having an inorganic surface.

In the first embodiment, the amount of the silane coupling agent (S) to be used is preferably 0.1 parts by mass or more and 10 parts by mass or less, and more preferably 1 part by mass or more and 5 parts by mass or less, based on 100 parts by mass of the total amount of the hydrophilic compounds.

In the second embodiment, the amount of the silane coupling agent (S) contained in the hydrophilic treatment coating composition is preferably 0.1 parts by mass or more and 10 parts by mass or less, and more preferably 0.2 parts by mass or more and 7 parts by mass or less, based on 100 parts by mass of the total amount of the hydrophilic compounds. When the hydrophilic compound (A) and the hydrophilic compound (B) are contained as a hydrophilic compound, the "total amount of the hydrophilic compounds" means the total amount of the hydrophilic compound (A) and the hydrophilic compound (B).

In the first embodiment and the second embodiment, a catalyst may be used together with the silane coupling agent (S). Examples of the catalyst include acidic catalysts (e.g., an aqueous hydrochloric acid solution, an aqueous sulfuric acid solution, an aqueous nitric acid solution, an aqueous phosphoric acid solution, and an aqueous solution of a compound having a carboxylic acid such as formic acid, acetic acid, or propionic acid) and basic catalysts (e.g., an aqueous ammonia solution, morpholine, N-methylmorpholine, N-ethylmorpholine, piperazine, hydroxyethylpiperazine, 2-methylpiperazine, trans-2,5-dimethylpiperazine, cis-2,6-dimethylpiperazine, triethylamine, N,N-dimethylethanolamine, N,N-diethylethanolamine, N-(β-aminoethyl)ethanolamine, N-methyldiethanolamine, N-n-butylethanolamine, N-n-butyldiethanolamine, N-t-butylethanolamine, N-t-butyldiethanolamine, N-(β-aminoethyl)isopropanolamine, N,N-diethylisopropanolamine, 2-amino-2-methyl-1-propanol, an aqueous sodium hydroxide solution, and an aqueous potassium hydroxide solution).

Hydrophilic Compound (A)

The hydrophilic compound (A) is a compound having at least one of a sulfonic acid group and an alkali metal salt of a sulfonic acid group (hereinafter, it may be briefly referred to as "sulfonic acid group or the like"). When the hydrophilic treatment coating composition contains the hydrophilic compound (A), a sulfonic acid group and/or a salt thereof can be introduced into an inorganic substrate, whereby a hydrophilic function is exhibited.

The hydrophilic compound (A) preferably has a functional group that reacts with the silane coupling agent (S) in addition to the sulfonic acid group. When the silane coupling agent (S) has a radical reactive functional group ($R_S$), the hydrophilic compound (A) preferably has a radical reactive functional group ($R_A$). Examples of the radical reactive functional group ($R_A$) include an acrylamide group, an acryloyl group, a methacryloyl group, an allyl group, a vinyl group, a styryl group, and a mercapto group. Of these radical reactive functional groups, only a single type may be contained or two or more types may be contained.

When the silane coupling agent (S) has a condensation type reactive functional group ($R_{S2}$), the hydrophilic compound (A) preferably has a condensation type reactive functional group ($R_{A2}$). Examples of the condensation type reactive functional group ($R_{A2}$) include a carboxy group, a hydroxy group, an amino group, an epoxy group, a ureido group, an isocyanate group, and an isocyanurate group. Of these condensation type reactive functional groups, only a single type may be contained or two or more types may be contained.

Preferably, the hydrophilic compound (A) does not have any hydrophilic portion other than ends of the molecular chain. The "hydrophilic portion" in the hydrophilic compound (A) means a sulfonic acid group or the like of the hydrophilic compound (A) and other hydrophilic groups. When the hydrophilic compound (A) has such a structure, the hydrophilic groups of the hydrophilic compounds (A) can be concentrated on the surface of a coating film that is not on the inorganic substrate side. Therefore, there is an advantage that sufficient washing property and washing durability can be imparted to members that are frequently washed with water, such as sanitary crockery.

Specific examples of the hydrophilic compound (A) include
sodium vinylsulfonate,
vinylsulfonic acid,
lithium N-t-butylacrylamide sulfonate,
sodium N-t-butylacrylamide sulfonate,
potassium N-t-butylacrylamide sulfonate,
2-sodiumsulfoethyl methacrylate,
sodium allylsulfonate,
sodium p-styrenesulfonate,
sodium sulfonate-containing urethane acrylate, and
N-t-butylacrylamide sulfonic acid.

As the hydrophilic compound (A), only one hydrophilic compound may be used alone, or two or more hydrophilic compounds may be used in combination. The hydrophilic compound (A) may be neutralized by adding an aqueous solution of an alkali metal hydroxide, such as sodium hydroxide and potassium hydroxide, to form a sulfonate salt.

A commercially available product may be used as the hydrophilic compound (A). Examples of the commercially available product include ATBS (registered trademark)-Na available from Toagosei Co., Ltd., N-SVS-25 available from Asahi Kasei Finechem Co., Ltd., ANTOX MS-2N available from Nippon Nyukazai Co., Ltd., and SPINOMER (registered trademark) NaSS available from Tosoh Organic Chemical Co., Ltd. The hydrophilic compound (A) may also be prepared by a commonly used method. For example, sodium sulfonate-containing urethane acrylate and the like can be prepared by a technique commonly used by those skilled in the art.

The hydrophilic compound (A) preferably has a number average molecular weight of 70 or more and 500 or less. When the number average molecular weight is within the above range, there is an advantage that hydrophilicity can be more favorably imparted.

Hydrophilic Compound (B)

The hydrophilic compound (B) is a compound having a quaternary ammonium cationic group. When the hydrophilic treatment coating composition comprises the hydrophilic compound (B) in addition to the hydrophilic compound (A), there is an advantage that good soil guard property and good durability of soil guard performance can be obtained. Although not being bound by a specific theory, it is considered that when the hydrophilic compound (B) is contained in addition to the hydrophilic compound (A), it is possible to effectively prevent a basic washing component such as a quaternary ammonium salt which may be contained in, for example, a commercially available detergent from being ionically bonded to a sulfonic acid or the like of the hydrophilic compound (A), thereby improving the durability of the soil guard performance.

The hydrophilic compound (B) preferably has a functional group that reacts with the silane coupling agent (S) in addition to the quaternary ammonium cationic group. When the silane coupling agent (S) has a radical reactive functional group ($R_S$), the hydrophilic compound (B) preferably has a radical reactive functional group ($R_B$). Examples of the radical reactive functional group ($R_B$) include an acrylamide group, an acryloyl group, a methacryloyl group, an allyl group, a vinyl group, a styryl group, and a mercapto group. Of these radical reactive functional groups, only a single type may be contained or two or more types may be contained.

When the silane coupling agent (S) has a condensation type reactive functional group ($R_{S2}$), the hydrophilic compound (B) preferably has a condensation type reactive functional group ($R_{B2}$). Examples of the condensation type reactive functional group ($R_{B2}$) include a carboxy group, a hydroxy group, an amino group, an epoxy group, a ureido group, an isocyanate group, and an isocyanurate group. Of these condensation type reactive functional groups, only a single type may be contained or two or more types may be contained.

Preferably, the hydrophilic compound (B) does not have any hydrophilic portion other than ends of the molecular chain. The "hydrophilic portion" in the hydrophilic compound (B) means a quaternary ammonium cationic group of the hydrophilic compound (B) and other hydrophilic groups. When the hydrophilic compound (B) has such a structure, the hydrophilic groups of the hydrophilic compounds (B) can be concentrated on the surface of a coating film that is not on the inorganic substrate side. This offers an advantage that sufficient washing property and washing durability can be imparted to members that are frequently washed with water, such as sanitary crockery.

Specific examples of the hydrophilic compound (B) include
(3-acrylamidopropyl)trimethyl ammonium chloride,
(3-acrylamidopropyl)trimethyl ammonium bromide,
[3-(methacryloylamino)propyl]trimethyl ammonium chloride,
2-(acryloyloxy)-N,N,N-trimethylethane aminium chloride, and
2-(methacryloyloxy)ethyltrimethyl ammonium chloride.

As the hydrophilic compound (B), only one hydrophilic compound may be used alone, or two or more hydrophilic compounds may be used in combination.

A commercially available product may be used as the hydrophilic compound (B). The hydrophilic compound (B) may also be prepared by a commonly used method.

The hydrophilic compound (B) preferably has a number average molecular weight of 70 or more and 500 or less. When the number average molecular weight is within the above range, there is an advantage that hydrophilicity can be more favorably imparted.

The ratio of the amount of the hydrophilic compound (A) to the amount of the hydrophilic compound (B) in the hydrophilic treatment coating composition is preferably (A):(B)=15:85 to 85:15, more preferably 30:70 to 70:30, and still more preferably 40:60 to 60:40. When the ratio (A):(B) is within the above range, there is an advantage that good durability of the soil guard performance can be obtained.

When the hydrophilic compound (A) and the hydrophilic compound (B) each have a radical reactive functional group, where an average value of the number of carbon atoms existing between the radical reactive functional group ($R_A$) and the sulfonic acid group in the hydrophilic compound (A) is expressed by ($n_1$), and an average value of the number of carbon atoms existing between the radical reactive functional group ($R_B$) and the quaternary ammonium cationic functional group in the hydrophilic compound (B) is expressed by ($n_2$), the ($n_1$) and the ($n_2$) preferably have a relationship of ($n_2$)>($n_1$).

When the average number of carbon atoms ($n_1$) and the average number of carbon atoms ($n_2$) have the relationship of ($n_2$)>($n_1$), it is considered that the proportion of the quaternary ammonium cationic functional groups of the hydrophilic compound (B) existing on the surface side is higher than that of the sulfonic acids of the hydrophilic compound (A) after the hydrophilic treatment coating composition is applied and reacted to the inorganic substrate. It is considered that this makes it possible to achieve better durability of the soil guard performance. The difference between the average number of carbon atoms ($n_1$) and the average number of carbon atoms ($n_2$) is more preferably 1 or more, and still more preferably 2 or more.

Similarly, when the hydrophilic compound (A) and the hydrophilic compound (B) each have a condensation type reactive functional group, where an average value of the number of carbon atoms existing between the condensation type reactive functional group ($R_{A2}$) and the sulfonic acid group in the hydrophilic compound (A) is expressed by ($n_{12}$), and an average value of the number of carbon atoms existing between the condensation type reactive functional group ($R_{B}2$) and the quaternary ammonium cationic functional group in the hydrophilic compound (B) is expressed by ($n_{22}$), the ($n_{12}$) and the ($n_{22}$) preferably have a relationship of ($n_{22}$)>($n_{12}$).

The difference between the average number of carbon atoms ($n_{12}$) and the average number of carbon atoms ($n_{22}$) is more preferably 1 or more, and still more preferably 2 or more.

Another embodiment of the hydrophilic treatment coating composition may include, for example, a hydrophilic treatment coating composition in which both the hydrophilic compound (A) and the hydrophilic compound (B) have copolymerizability, these compounds are each a compound that form at least one type of linear polymer selected from the group consisting of an alternating copolymer, a random copolymer, and a block copolymer, and at least one of the hydrophilic compound (A) and the hydrophilic compound (B) further has bondability to a silane coupling agent. Also in such an embodiment, there is an advantage that good soil guard property can be imparted to an inorganic substrate having a surface layer containing an inorganic compound.

Hydrophilic Compound (C)

The hydrophilic treatment coating composition may contain a hydrophilic compound (C), as necessary. The hydrophilic compound (C) is a hydrophilic compound having a nonionic group. However, a hydrophilic compound that has a nonionic group and that corresponds to the hydrophilic compound (A) or (B) is not regarded as the hydrophilic compound (C).

Radical Polymerization Initiator

When the silane coupling agent (S), the hydrophilic compound (A), and the hydrophilic compound (B) each have a radical reactive functional group, the hydrophilic treatment coating composition preferably further comprises a radical polymerization initiator. The radical polymerization initiator is a compound that is decomposed by light or heat to generate radicals. Radical polymerization initiators are classified into photo-radical polymerization initiators that are decomposed by light and thermal radical polymerization initiators that are decomposed by heat. The radical polymerization initiator is preferably water-soluble.

Preferred examples of the photo-radical polymerization initiator include benzophenone, 1-hydroxy-cyclohexyl-phenyl-ketone, a mixture of 1-hydroxy-cyclohexyl-phenyl-ketone and benzophenone, 1-[4-(2-hydroxyethoxy)-phenyl]-2-hydroxy-2-methyl-1-propane-1-one, 2-hydroxy-2-methyl-1-phenylpropane-1-one, 2-hydroxy-1-[4-{4-(2-hydroxy-2-methyl-propionyl)-benzyl}phenyl]-2-methyl-1-propane-1-one, oxyphenylacetic acid, a mixture of 2-[2-oxo-2-phenylacetoxyethoxy]ethyl ester, oxyphenylacetic acid, and 2-(2-hydroxyethoxy)ethyl ester, and bis(2,4,6-trimethylbenzoyl)-phenylphosphine oxide. To the photo-radical polymerization initiator may, as necessary, be added a sensitizer such as ethyl p-dimethylaminobenzoate (KAYACURE EPA manufactured by Nippon Kayaku Co., Ltd.). As such a commercially available product, Omnirad (registered trademark) 184, Omnirad (registered trademark) 500, Omnirad (registered trademark) 2959, DAROCURE (registered trademark) 1173, Omnirad (registered trademark) 127, Omnirad (registered trademark) 754, and Omnirad (registered trademark) 819DW, available from IGM Resins B.V., can be used.

Preferable examples of the thermal radical polymerization initiator include azo compounds such as 2,2'-azobis[2-(2-imidazolin-2-yl)propane]dihydrochloride, 2,2'-azobis[2-(2-imidazolin-2-yl)propane] disulfate dihydrate, 2,2'-azobis[2-(2-imidazolin-2-yl)propane], 2,2'-azobis(propane-2-carboamidine) dihydrochloride, 2,2'-azobis[N-(2-carboxyethyl)-2-methylpropionamidine] n-hydrate, 2,2'-azobis[2-methyl-N-(2-hydroxyethyl)propionamide], and 4,4'-azobis(4-cyanopentanoic acid), persulfate salts such as ammonium persulfate, sodium persulfate, and potassium persulfate, and peroxides such as hydrogen peroxide, cumyl perneodecanoate, 1,1,3,3-tetramethylbutyl peroxy neodecanoate, t-hexyl peroxyneodecanoate, t-butyl peroxyneodecanoate, t-hexyl peroxypivalate, and t-butyl peroxypivalate. To the thermal radical polymerization initiator may, as necessary, be added water or the like. As a commercially available product thereof, VA-044, VA-046B, VA-061, V-50, VA-057, VA-086 and V-501 manufactured by Wako Pure Chemical Industries, Ltd., PERCUMYL ND-50E, PEROCTA ND-50E, PERHEXYL ND-50E, PERBUTYL ND-50E, PERHEXYL PV-50E and PERBUTYL PV-40E manufactured by NOF CORPORATION, and reagents available from various companies can be used.

The blending amount of the radical polymerization initiator is preferably 1 part by mass or more and 75 parts by mass or less, and more preferably 5 parts by mass or more and 60 parts by mass or less, based on 100 parts by mass of the total amount (solid mass) of the hydrophilic compounds.

Other Components

The hydrophilic treatment coating composition may comprise a solvent, as necessary. By containing a solvent, there is an advantage that the hydrophilic compounds can be dissolved or dispersed well. Examples of a preferable solvent include water, methanol, ethanol, isopropyl alcohol, and n-propyl alcohol. These solvents can be appropriately selected according to the type and content of each of the hydrophilic compounds described above.

The hydrophilic treatment coating composition may comprise an additive, as necessary, in addition to the above components. Examples of the additive include a surface conditioning agent, a compatibilizer, a leveling agent, a plasticizer, an antifoaming agent, an ultraviolet absorber, an antioxidant, and a rheology modifier. Of these additives, only a single type may be contained or two or more types may be contained.

Examples of the compatibilizer that can be used as an additive include amide compounds such as urea, melamine, acryloylmorpholine, dimethylacrylamide, dimethylaminopropylacrylamide, isopropylacrylamide, diethylacrylamide, and hydroxyethylacrylamide; aprotic polar solvents such as dimethylsulfoxide, acetonitrile, and N,N-dimethylformamide; polyhydric alcohols such as ethylene glycol, glycerin, trimethylolpropane, ditrimethylolpropane, erythritol, and dipentaerythritol; saccharides such as triose, tetrose, pentose, hexose, sedoheptulose, glucose, maltose, sucrose, lactose, cellobiose, raffinose, acarbose, oligosaccharides, cyclodextrins, dextrins, and starches; resins having polarity such as sodium carboxymethylcellulose, polyvinylpyrrolidone, sodium polyacrylate, and modified urea; and inorganic salts such as sodium hydrogen carbonate, sodium carbonate, sodium hydrogen sulfate, and sodium sulfate. The content of the compatibilizer is preferably 10 parts by mass or more and 100 parts by mass or less based on 100 parts by mass of the total amount of the hydrophilic compounds.

The solid concentration of the hydrophilic compounds is preferably 0.1% by mass or more and 60% by mass or less. When the solid concentration is within the above range, there is an advantage that good soil guard property and the like can be obtained.

Another embodiment of the hydrophilic treatment coating composition is, for example, an embodiment of being a hydrophilic treatment coating composition set wherein the hydrophilic compound (A) and the hydrophilic compound (B) are stored separately from each other. Another possible embodiment may be an embodiment of being a hydrophilic treatment coating composition set wherein, in the second embodiment, the silane coupling agent (S), the hydrophilic compound (A), and the hydrophilic compound (B) are stored separately from each other. These embodiments may be appropriately selected according to the storage stability and reactivity of each component.

Method of Hydrophilic Treatment of Inorganic Substrate

The present description provides hydrophilic treatment of an inorganic substrate using the hydrophilic treatment coating composition described above. Examples of the hydrophilic treatment method include the following two embodiments.

First Embodiment of Hydrophilic Treatment Method

In the first embodiment of hydrophilic treatment method, the hydrophilic treatment coating composition of the first embodiment described above is used. The method comprises:

surface-treating a surface of an inorganic substrate with a silane coupling agent (S); and applying the hydrophilic treatment coating composition of the first embodiment to the inorganic substrate treated with the silane coupling agent (S), and then making the silane coupling agent (S) react with at least one of the hydrophilic compound (A) and the hydrophilic compound (B) by light or heat.

Second Embodiment (1) of Hydrophilic Treatment Method

A method of hydrophilic treatment of an inorganic substrate comprises:

subjecting the hydrophilic treatment coating composition of the second embodiment described above to light or heat to react a silane coupling agent (S) with at least one of the hydrophilic compound (A) and the hydrophilic compound (B), and

applying the hydrophilic treatment coating composition after the reaction to a surface of an inorganic substrate.

Second Embodiment (2) of Hydrophilic Treatment Method

A method of hydrophilic treatment of an inorganic substrate comprises:

applying the hydrophilic treatment coating composition of the second embodiment described above to a surface of an inorganic substrate; and making the silane coupling agent (S) react with at least one of the hydrophilic compound (A) and the hydrophilic compound (B) by light irradiation or heating.

In any of the hydrophilic treatment methods described above, the object (the article to be coated) to be subjected to the hydrophilic treatment method using a hydrophilic treatment coating composition is an inorganic substrate. In the present description, the "inorganic substrate" means a substrate having a surface layer containing an inorganic compound (a substrate having an inorganic surface). Examples of the surface layer containing an inorganic compound include glass, metal and metal oxides, and silicon dioxide other than glass. Specific examples of the inorganic substrate include housing-related materials such as sanitary crockery, tiles, enamels, glass, siding materials, sashes, walls, mirrors, and bathtubs. Examples of suitable articles to be coated in the hydrophilic treatment method include sanitary crockery. A sanitary crockery is a member which is a residential equipment device to be installed at a water-using site in a building, such as a toilet bowl, a face washing basin, and a hand washing basin, and is almost entirely or partly constituted of crockery. Such a sanitary crockery is generally a member in which a glassy layer is formed on a surface of a base material (for example, unglazed ceramic) made of a starting material such as clay, pottery stone, or feldspar by glazing and firing the base material.

In the first embodiment of the hydrophilic treatment method, the surface of the inorganic substrate is surface-treated with the silane coupling agent (S) by applying the silane coupling agent (S) to the surface of the inorganic substrate. More specifically, silanol groups generated by hydrolysis of reactive silyl groups undergo a bonding reaction to the inorganic surface of the inorganic substrate.

Subsequently, the hydrophilic treatment coating composition of the first embodiment is applied to the inorganic substrate treated with the silane coupling agent (S). Then, after applying the hydrophilic treatment coating composition, the silane coupling agent (S) is made to react with at least one of the hydrophilic compound (A) and the hydrophilic compound (B) by light or heat. For example, when the silane coupling agent (S), the hydrophilic compound (A), and the hydrophilic compound (B) each have a radical reactive functional group, the radical reactive functional groups of the silane coupling agent (S), the hydrophilic compound (A), and the hydrophilic compound (B) can be radically reacted by irradiating with light or heating. When the silane coupling agent (S), the hydrophilic compound (A), and the hydrophilic compound (B) each have a condensation type reactive functional group, the condensation type reactive functional groups of the silane coupling agent (S), the hydrophilic compound (A), and the hydrophilic compound (B) can be made to undergo a condensation reaction by heating.

By the above reaction, the surface of the inorganic substrate can be applied with hydrophilic treatment. In the hydrophilic treatment using the hydrophilic treatment coating composition, when the hydrophilic treatment coating composition comprises both the hydrophilic compound (A) and the hydrophilic compound (B), there is an advantage that good soil guard property can be obtained and good soil guard performance durability can also be obtained.

In the second embodiment (1) of the hydrophilic treatment method, the hydrophilic treatment coating composition of the second embodiment, namely, the hydrophilic treatment coating composition comprising at least of the silane coupling agent (S), the hydrophilic compound (A), and the hydrophilic compound (B) is subjected to light or heat to react the silane coupling agent (S) with at least one of the hydrophilic compound (A) and the hydrophilic compound (B). In this reaction, when the silane coupling agent (S), the hydrophilic compound (A), and the hydrophilic compound (B) each have a radical reactive functional group, the radical reactive functional groups of the silane coupling agent (S), the hydrophilic compound (A), and the hydrophilic compound (B) can be radically reacted by irradiating with light or heating. When the silane coupling agent (S), the hydrophilic compound (A), and the hydrophilic compound (B) each have a condensation type reactive functional group, the condensation type reactive functional groups of the silane coupling agent (S), the hydrophilic compound (A), and the hydrophilic compound (B) can be made to undergo a condensation reaction by heating.

By applying the reacted composition to the inorganic surface of the inorganic substrate, the silanol group generated by hydrolysis of the reactive silyl group of the silane coupling agent (S) reacts with the inorganic surface of the inorganic substrate, whereby the surface of the inorganic substrate can be hydrophilized.

In the second embodiment (2) of the hydrophilic treatment method, the hydrophilic treatment coating composition of the second embodiment, namely, the hydrophilic treatment coating composition comprising at least one of the silane coupling agent (S), the hydrophilic compound (A), and the hydrophilic compound (B) is applied to an inorganic surface of an inorganic substrate, and then subjected to light or heat. The radical reactive functional group of the silane coupling agent (S) reacts with at least one of the radical reactive functional groups of the hydrophilic compound (A) and the hydrophilic compound (B), or the condensation type reactive functional group of the silane coupling agent (S) reacts with at least one of the condensation type reactive functional groups of the hydrophilic compound (A) and the hydrophilic compound (B). On the other hand, the silanol group generated by hydrolysis of the reactive silyl group of the silane coupling agent (S) reacts with the inorganic surface of the inorganic substrate, and the silanol group generated by hydrolysis of the reactive silyl group undergoes a bonding reaction. The surface of the inorganic substrate can thereby be hydrophilized.

In the reaction of the silane coupling agent (S) with the hydrophilic compound (A) and the hydrophilic compound (B), one of the hydrophilic compound (A) and the hydrophilic compound (B) may be preferentially reacted and then the other may be reacted. Examples of the method of controlling the reaction order of the hydrophilic compound (A) and the hydrophilic compound (B) include a method in which a compound having higher reactivity is used as one of the hydrophilic compound (A) and the hydrophilic compound (B).

Examples of the light irradiation include an embodiment in which an active energy ray is applied. More specifically, active energy rays, more preferably, ultraviolet rays having a wavelength in a range of 220 to 450 nm, may be applied using, for example, a high pressure mercury lamp, an ultra-high pressure mercury lamp, a metal halide lamp, an ultraviolet LED lamp, or the like. Examples of the heating condition include heating using a commonly used heating furnace, a hot air dryer, an IR heater, or the like, and heat irradiation using an infrared heat irradiation apparatus. In the heating condition, for example, the heating temperature may be 80° C. or higher and 150° C. or lower.

EXAMPLES

The present invention will be described hereafter in more detail by way of examples, to which the present invention is not intended to be limited. In the examples, "parts" and "%" are on a mass basis unless otherwise indicated.

Synthesis Example 1 Synthesis of Sodium Sulfonate-Containing Urethane Acrylate 45.2 parts by mass of aminoethylsulfonic acid, 14.8 parts by mass of sodium hydroxide, and 40 parts by mass of ion-exchanged water were reacted at room temperature of 20 to 25° C.

42.5 parts by mass of the resulting reaction product was maintained at a temperature of 5 to 10° C., and a solution prepared by mixing and dissolving 24.5 parts by mass of 2-isocyanatoethyl acrylate (KARENZ AOI (registered trademark) manufactured by Showa Denko K.K.) in 33 parts by mass of 1-methoxy-2-propanol was added dropwise thereto over 5 minutes. Subsequently, the mixture was stirred for 4 hours. It was confirmed by an infrared absorption spectrum that no absorption derived from an isocyanate group was observed and the reaction was completed, and thus a sodium sulfonate-containing urethane acrylate was obtained.

Example 1-1

Preparation of Hydrophilic Treatment Coating Composition 27.5 parts by weight of ion-exchanged water and 10 parts by weight of urea were mixed, and the mixture was stirred until urea was dissolved. Then, 30 parts by mass of sodium vinylsulfonate, 70 parts by mass of (3-acrylamidopropyl) trimethylammonium chloride, 50 parts by mass of 2-hydroxy-2-methyl-1-phenylpropanone, and 100 parts by mass of isopropyl alcohol were added thereto, and the mixture was stirred until it became a transparent homogeneous solution, and thus a hydrophilic treatment coating composition was prepared.

Hydrophilic Treatment 1 part by mass of 3-methacryloxypropyltrimethoxysilane as a silane coupling agent (S) and 98 parts by mass of 1-methoxy-2-propanol were stirred and mixed at room temperature. Subsequently, 1 part by mass of a 3% aqueous hydrochloric acid solution was added thereto, and the mixture was further stirred for 30 minutes to perform hydrolysis.

The resulting solution was applied to a crockery with silicon oxide on the surface thereof, dried at 60° C. for 30 minutes using an electric oven, and then left at room temperature for 30 minutes.

Subsequently, the hydrophilic treatment coating composition prepared above was applied. Thereafter, hydrophilic treatment was performed by performing ultraviolet irradiation with a high pressure mercury lamp such that an integrated light amount was an energy of 1000 mJ/cm².

Examples 1-2 to 1-42 and Comparative Examples 1-1 to 1-16

In Examples 1-2 to 1-42 and Comparative Examples 1-1 to 1-16, a hydrophilic treatment coating composition was prepared and hydrophilic treatment was performed in the same manner as in Example 1-1 except that the type and amount of the silane coupling agent (S) and the types and amounts of the hydrophilic compounds (A) and (B) and the polymerization initiator were changed according to the following Table 1 or 2.

Example 2-1

Preparation of Hydrophilic Treatment Coating Composition 27.5 parts by weight of ion-exchanged water and 10 parts by weight of urea were mixed, and the mixture was stirred until urea was dissolved. Thereafter, 30 parts by mass of sodium vinylsulfonate, 70 parts by mass of (3-acrylamidopropyl)trimethylammonium chloride, 5 parts by mass of potassium persulfate, and 100 parts by mass of isopropyl alcohol were added thereto, and the mixture was stirred until it became a transparent homogeneous solution, and thus a hydrophilic treatment coating composition was prepared.

Hydrophilic Treatment 1 part by mass of 3-methacryloxypropyltrimethoxysilane as a silane coupling agent (S) and 98 parts by mass of 1-methoxy-2-propanol were stirred and mixed at room temperature. Thereafter, 1 part by mass of a 3% aqueous hydrochloric acid solution was added thereto, and the mixture was further stirred for 30 minutes to perform hydrolysis.

The resulting solution was applied to a crockery with silicon oxide on the surface thereof, dried at 60° C. for 30 minutes using an electric oven, and then left at room temperature for 30 minutes.

Subsequently, hydrophilic treatment was performed by applying the hydrophilic treatment coating composition prepared above and then heating it using an electric oven.

Examples 2-2 to 2-32 and Comparative Examples 2-1 to 2-15

In Examples 2-2 to 2-32 and Comparative Examples 2-1 to 2-15, a hydrophilic treatment coating composition was prepared and hydrophilic treatment was performed in the same method as in Example 2-1 except that the type of the silane coupling agent (S) and the types and amounts of the hydrophilic compounds (A) and (B) and the polymerization initiator were changed according to the following tables.

The hydrophilic treatments performed in the above Examples and Comparative Examples was evaluated as follows. The result of the evaluation is shown in the following tables.

Evaluation of Durability

As a standard for evaluating the durability of hydrophilic treatment, a contact angle of a water droplet with respect to a surface was used in conformity to JIS R 3257 "Testing method of wettability of glass substrate" (a static drop method was used as a type of the testing method).

Specifically, with regard to measurement of a contact angle of a water droplet, using DMo-701 manufactured by Kyowa Interface Science Co., Ltd., 4 μL of distilled water was added dropwise to a coated film and a contact angle after 60 seconds was measured. This method utilizes the phenomenon that when a physical or chemical change is caused by subjecting a surface to physical or chemical treatment, the contact angle of a water droplet varies.

A state in which the coated surface of a coated article subjected to hydrophilic treatment has not been subjected to any treatment was defined as "initial".

The evaluation conducted for a coating film prepared by dropping 1 mL of a cationic surfactant SUNPOLE (trade name) to the coated surface of a coated article subjected to the hydrophilic treatment and then drying it was defined as "detergent resistance (cation)".

The evaluation conducted for a coating film prepared by dropping 1 mL of a nonionic surfactant BATH MAGICLEAN (trade name) to the coated surface of a coated article subjected to the hydrophilic treatment and then drying it was defined as "detergent resistance (nonion)".

The evaluation conducted for a coating film prepared by dropping 1 mL of an anionic surfactant MAMA LEMON (trade name) to the coated surface of a coated article subjected to the hydrophilic treatment and then drying it was defined as "detergent resistance (anion)".

A contact angle of a water droplet with respect to each coating film was measured, and evaluation was conducted according to the following criteria. In the evaluation, ○ and Δ were determined to be good, and × was determined to be poor.

○: The contact angle of a water droplet was more than 100 and less than 20°.

Δ: The contact angle of a water droplet was more than 20° and less than 40°.

x: The contact angle of a water droplet was more than 40°.

Evaluation of Mineral Removability (Evaluation of Detergency to Inorganic Substances)

150 μL of water was dropped to a coated surface of a coated article after hydrophilic treatment, and then the coated surface was dried at 40° C. for 24 hours to form a white water droplet spot. Thereafter, 3M Scotch-Brite (™) antibacterial urethane sponge S-21KS was reciprocated 20 times under a load of 500 gf in water of 20 to 25° C. Then, a remaining water droplet spot was visually observed and evaluated according to the following criteria. In the following criteria, O and A were determined to be acceptable, and X was determined to be defective.

○: No water droplet spot is visually recognized at the state after 20 reciprocations.

Δ: Slight water droplet spots are visually recognized at the state after 20 reciprocations.

x: Water droplet spots are visually clearly recognized at the state after 20 reciprocations.

TABLE 1

| | | Example 1- | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Silane coupling agent (S) | 3-Methacryloxypropyltrimethoxysilane | o | o | o | o | | o | o | o | o | o | o | o | o | o |
| | 3-Acryloxypropyltrimethoxysilane | | | | | o | | | | | | | | | |
| Catalyst | 3% Hydrochloric acid | | | | | | | | | | | | | | |
| | 4% Aqueous sodium hydroxide solution | | | | | | | | | | | | | | |
| Hydrophilic compound (A) | Sodium vinylsulfonate | 30 | 50 | 50 | 50 | 50 | 50 | 50 | 50 | 50 | 70 | 95 | 15 | | 25 |
| | Vinylsulfonic acid | | | | | | | | | | | | | | |
| | Sodium N-t-butylacrylamide sulfonate | | | | | | | | | | | | 15 | 30 | 25 |
| | Potassium N-t-butylacrylamide sulfonate | | | | | | | | | | | | | | |
| | 2-Sodiumsulfoethyl methacrylate | | | | | | | | | | | | | | |
| | Sodium allylsulfonate | | | | | | | | | | | | | | |
| | Sodium p-styrenesulfonate | | | | | | | | | | | | | | |
| | Sodium sulfonate-containing urethane acrylate (*1) | | | | | | | | | | | | | | |
| | N-t-butylacrylamide sulfonic acid | | | | | | | | | | | | | | |
| Hydrophilic compound (B) | (3-Acrylamidopropyl) trimethyl ammonium chloride | 70 | 50 | 50 | 50 | 50 | 50 | 50 | 50 | 50 | 30 | 5 | 70 | 70 | 50 |
| | (3-Acrylamidopropyl) trimethyl ammonium bromide | | | | | | | | | | | | | | |
| | [3-(Methacryloylamino)propyl] trimethyl ammonium chloride | | | | | | | | | | | | | | |
| | 2-(Acryloyloxy)-N,N,N-trimethylethane aminium chloride | | | | | | | | | | | | | | |
| | 2-(Methacryloyloxy) ethyltrimethyl ammonium chloride | | | | | | | | | | | | | | |
| Polymerization initiator | 2-Hydroxy-2-methyl-1-phenylpropanone | 50 | 50 | 50 | 50 | 50 | 75 | 25 | | | 50 | 50 | 50 | 50 | 50 |
| | 1-Hydroxycyclohexyl phenyl ketone/benzophenone | | | | | | | | 50 | | | | | | |
| | 1-[4-(2-Hydroxyethoxy)-phenyl]-2-hydroxymethylpropanone | | | | | | | | | 50 | | | | | |
| | Potassium persulfate | | | | | | | | | | | | | | |
| Evaluation Durability | Initial | o | o | o | o | o | o | o | o | o | o | o | o | o | o |
| | Detergent resistance (cation) | o | o | o | o | o | o | o | o | o | o | Δ | o | o | o |
| | Detergent resistance (nonion) | o | o | o | o | o | o | o | o | o | o | o | o | o | o |
| | Detergent resistance (anion) | o | o | o | o | o | o | o | o | o | o | o | o | o | o |
| | Mineral removability | o | o | o | o | o | o | o | o | o | o | o | o | o | o |

| | | Example 1- | | | | | | | | | | | | | |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Silane coupling agent (S) | 3-Methacryloxypropyltrimethoxysilane | | o | o | o | o | o | | o | o | o | o | o | o | o |
| | 3-Acryloxypropyltrimethoxysilane | o | | | | | | o | | | | | | | |
| Catalyst | 3% Hydrochloric acid | | | | | | | | | | | | | | |
| | 4% Aqueous sodium hydroxide solution | | | | | | | | | | | | | | |
| Hydrophilic compound (A) | Sodium vinylsulfonate | 25 | 25 | 25 | 25 | 25 | | | | | | | | 35 | |
| | Vinylsulfonic acid | | | | | | | | | | | | | | |

TABLE 1-continued

|  |  |  |  |  |  |  |  |  |  |  |  |  |  |  |  |
|---|---|---|---|---|---|---|---|---|---|---|---|---|---|---|---|
|  | Sodium N-t-butylacrylamide sulfonate | 25 | 25 | 25 | 25 | 25 | 50 | 50 | 50 | 50 | 50 | 50 | 35 | 70 | 95 |
|  | Potassium N-t-butylacrylamide sulfonate |  |  |  |  |  |  |  |  |  |  |  |  |  |  |
|  | 2-Sodiumsulfoethyl methacrylate |  |  |  |  |  |  |  |  |  |  |  |  |  |  |
|  | Sodium allylsulfonate |  |  |  |  |  |  |  |  |  |  |  |  |  |  |
|  | Sodium p-styrenesulfonate |  |  |  |  |  |  |  |  |  |  |  |  |  |  |
|  | Sodium sulfonate-containing urethane acrylate (*1) |  |  |  |  |  |  |  |  |  |  |  |  |  |  |
|  | N-t-butylacrylamide sulfonic acid |  |  |  |  |  |  |  |  |  |  |  |  |  |  |
| Hydrophilic compound (B) | (3-Acrylamidopropyl) trimethyl ammonium chloride | 50 | 50 | 50 | 50 | 50 | 50 | 50 | 50 | 50 | 50 | 50 | 30 | 30 | 5 |
|  | (3-Acrylamidopropyl) trimethyl ammonium bromide |  |  |  |  |  |  |  |  |  |  |  |  |  |  |
|  | [3-(Methacryloylamino)propyl] trimethyl ammonium chloride |  |  |  |  |  |  |  |  |  |  |  |  |  |  |
|  | 2-(Acryloyloxy)-N,N,N-trimethylethane aminium chloride |  |  |  |  |  |  |  |  |  |  |  |  |  |  |
|  | 2-(Methacryloyloxy) ethyltrimethyl ammonium chloride |  |  |  |  |  |  |  |  |  |  |  |  |  |  |
| Polymerization initiator | 2-Hydroxy-2-methyl-1-phenylpropanone | 50 | 75 | 25 |  |  | 50 | 50 | 75 | 25 |  |  | 50 | 50 | 50 |
|  | 1-Hydroxycyclohexyl phenyl ketone/benzophenone |  |  |  | 50 |  |  |  |  |  | 50 |  |  |  |  |
|  | 1-[4-(2-Hydroxyethoxyl)-phenyl]-2-hydroxymethylpropanone |  |  |  |  | 50 |  |  |  |  |  | 50 |  |  |  |
|  | Potassium persulfate |  |  |  |  |  |  |  |  |  |  |  |  |  |  |
| Evaluation Durability | Initial | ○ | ○ | ○ | ○ | ○ | ○ | ○ | ○ | ○ | ○ | ○ | ○ | ○ | ○ |
|  | Detergent resistance (cation) | ○ | ○ | ○ | ○ | ○ | ○ | ○ | ○ | ○ | ○ | ○ | ○ | ○ | Δ |
|  | Detergent resistance (nonion) | ○ | ○ | ○ | ○ | ○ | ○ | ○ | ○ | ○ | ○ | ○ | ○ | ○ | ○ |
|  | Detergent resistance (anion) | ○ | ○ | ○ | ○ | ○ | ○ | ○ | ○ | ○ | ○ | ○ | ○ | ○ | ○ |
|  | Mineral removability | ○ | ○ | ○ | ○ | ○ | ○ | ○ | ○ | ○ | ○ | ○ | ○ | ○ | ○ |

|  |  | Example 1- | | | | | | | | | | | | | |
|---|---|---|---|---|---|---|---|---|---|---|---|---|---|---|---|
|  |  | 29 | 30 | 31 | 32 | 33 | 34 | 35 | 36 | 37 | 38 | 39 | 40 | 41 | 42 |
| Silane coupling agent (S) | 3-Methacryloxypropyltrimethoxysilane | ○ | ○ | ○ | ○ | ○ | ○ | ○ | ○ | ○ | ○ | ○ | ○ | ○ | ○ |
|  | 3-Acryloxypropyltrimethoxysilane |  |  |  |  |  |  |  |  |  |  |  |  |  |  |
| Catalyst | 3% Hydrochloric acid |  |  |  |  |  |  |  |  |  |  |  |  | ○ |  |
|  | 4% Aqueous sodium hydroxide solution |  |  |  |  |  |  |  |  |  |  |  |  |  | ○ |
| Hydrophilic compound (A) | Sodium vinylsulfonate |  | 25 | 25 | 25 | 25 | 25 | 25 | 25 | 50 | 50 | 50 | 50 | 50 | 50 |
|  | Vinylsulfonic acid | 50 |  |  |  |  |  |  |  |  |  |  |  |  |  |
|  | Sodium N-t-butylacrylamide sulfonate |  | 25 |  |  |  |  |  |  |  |  |  |  |  |  |
|  | Potassium N-t-butylacrylamide sulfonate |  |  | 25 |  |  |  |  |  |  |  |  |  |  |  |
|  | 2-Sodiumsulfoethyl methacrylate |  |  |  | 25 |  |  |  |  |  |  |  |  |  |  |
|  | Sodium allylsulfonate |  |  |  |  | 25 |  |  |  |  |  |  |  |  |  |
|  | Sodium p-styrenesulfonate |  |  |  |  |  | 25 |  |  |  |  |  |  |  |  |
|  | Sodium sulfonate-containing urethane acrylate (*1) |  |  |  |  |  |  | 25 |  |  |  |  |  |  |  |
|  | N-t-butylacrylamide sulfonic acid |  |  |  |  |  |  |  | 25 |  |  |  |  |  |  |
| Hydrophilic compound (B) | (3-Acrylamidopropyl) trimethyl ammonium chloride | 50 | 50 | 50 | 50 | 50 | 50 | 50 | 50 |  |  |  |  | 50 | 50 |
|  | (3-Acrylamidopropyl) trimethyl ammonium bromide |  |  |  |  |  |  |  |  | 50 |  |  |  |  |  |
|  | [3-(Methacryloylamino)propyl] trimethyl ammonium chloride |  |  |  |  |  |  |  |  |  | 50 |  |  |  |  |
|  | 2-(Acryloyloxy)-N,N,N-trimethylethane aminium chloride |  |  |  |  |  |  |  |  |  |  | 50 |  |  |  |
|  | 2-(Methacryloyloxy) ethyltrimethyl ammonium chloride |  |  |  |  |  |  |  |  |  |  |  | 50 |  |  |
| Polymerization initiator | 2-Hydroxy-2-methyl-1-phenylpropanone | 50 | 50 | 50 | 50 | 50 | 50 | 50 | 50 | 50 | 50 | 50 | 50 | 50 | 50 |
|  | 1-Hydroxycyclohexyl phenyl ketone/benzophenone |  |  |  |  |  |  |  |  |  |  |  |  |  |  |
|  | 1-[4-(2-Hydroxyethoxyl)-phenyl]-2-hydroxymethylpropanone |  |  |  |  |  |  |  |  |  |  |  |  |  |  |
|  | Potassium persulfate |  |  |  |  |  |  |  |  |  |  |  |  |  |  |
| Evaluation Durability | Initial | ○ | ○ | ○ | ○ | ○ | ○ | ○ | ○ | ○ | ○ | ○ | ○ | ○ | ○ |
|  | Detergent resistance (cation) | ○ | ○ | ○ | ○ | ○ | ○ | ○ | ○ | ○ | ○ | ○ | ○ | ○ | ○ |
|  | Detergent resistance (nonion) | ○ | ○ | ○ | ○ | ○ | ○ | ○ | ○ | ○ | ○ | ○ | ○ | ○ | ○ |
|  | Detergent resistance (anion) | ○ | ○ | ○ | ○ | ○ | ○ | ○ | ○ | ○ | ○ | ○ | ○ | ○ | ○ |
|  | Mineral removability | ○ | ○ | ○ | ○ | ○ | ○ | ○ | ○ | ○ | ○ | ○ | ○ | ○ | ○ |

TABLE 2

|  |  |  | Comparative Example 1- | | | | | | | |
|---|---|---|---|---|---|---|---|---|---|---|
|  |  |  | 1 | 2 | 3 | 4 | 5 | 6 | 7 | 8 |
| Silane coupling agent (S) | | 3-Methacryloxypropyltrimethoxysilane |  | ○ | ○ | ○ | ○ | ○ | ○ | ○ |
| | | 3-Acryloxypropyltrimethoxysilane | | | | | | | | |
| Hydrophilic compound (A) | | Sodium vinylsulfonate | 50 | 100 | | | | | | |
| | | Vinylsulfonic acid | | | 100 | | | | | |
| | | Sodium N-t-butylacrylamide sulfonate | | | | 100 | | | | |
| | | Potassium N-t-butylacrylamide sulfonate | | | | | 100 | | | |
| | | 2-Sodiumsulfoethyl methacrylate | | | | | | 100 | | |
| | | Sodium allylsul fonate | | | | | | | 100 | |
| | | Sodium p-styrene sulfonate | | | | | | | | 100 |
| | | Sodium sulfonate-containing urethane acrylate (*1) | | | | | | | | |
| | | N-t-butylacrylamide sulfonic acid | | | | | | | | |
| Hydrophilic compound (B) | | (3-Acrylamidopropyl) trimethyl ammonium chloride | 50 | | | | | | | |
| | | (3-Acrylamidopropyl) trimethyl ammonium bromide | | | | | | | | |
| | | [3-(Methacryloylamino) propyl]trimethyl ammonium chloride | | | | | | | | |
| | | 2-(Acryloyloxy)-N,N,N-trimethylethane aminium chloride | | | | | | | | |
| | | 2-(Methacryloyloxy) ethyltrimethyl ammonium chloride | | | | | | | | |
| Polymerization initiator | | 2-Hydroxy-2-methyl-1-phenylpropanone | 50 | 50 | 50 | 50 | 50 | 50 | 50 | 50 |
| | | 1-Hydroxycyclohexyl phenyl ketone/benzophenone | | | | | | | | |
| | | 1-[4-(2-Hydroxyethoxyl)-phenyl]-2-hydroxymethylpropanone | | | | | | | | |
| | | Potassium persulfate | | | | | | | | |
| Evaluation Durability | Initial | | x | ○ | ○ | ○ | ○ | ○ | ○ | ○ |
| | Detergent resistance (cation) | | x | x | x | x | x | x | x | x |
| | Detergent resistance (nonion) | | x | ○ | ○ | ○ | ○ | ○ | ○ | ○ |
| | Detergent resistance (anion) | | x | ○ | ○ | ○ | ○ | ○ | ○ | ○ |
| | Mineral removability | | x | ○ | ○ | ○ | ○ | ○ | ○ | ○ |

|  |  |  | Comparative Example 1- | | | | | | |
|---|---|---|---|---|---|---|---|---|---|
|  |  |  | 9 | 10 | 11 | 12 | 13 | 14 | 15 |
| Silane coupling agent (S) | | 3-Methacryloxypropyltrimethoxysilane | ○ | ○ | ○ | ○ | ○ | ○ | ○ |
| | | 3-Acryloxypropyltrimethoxysilane | | | | | | | |
| Hydrophilic compound (A) | | Sodium vinylsulfonate | | | | | | | |
| | | Vinylsulfonic acid | | | | | | | |
| | | Sodium N-t-butylacrylamide sulfonate | | | | | | | |
| | | Potassium N-t-butylacrylamide sulfonate | | | | | | | |
| | | 2-Sodiumsulfoethyl methacrylate | | | | | | | |
| | | Sodium allylsul fonate | | | | | | | |
| | | Sodium p-styrene sulfonate | | | | | | | |
| | | Sodium sulfonate-containing urethane acrylate (*1) | 100 | | | | | | |
| | | N-t-butylacrylamide sulfonic acid | | 100 | | | | | |
| Hydrophilic compound (B) | | (3-Acrylamidopropyl) trimethyl ammonium chloride | | | 100 | | | | |
| | | (3-Acrylamidopropyl) trimethyl ammonium bromide | | | | 100 | | | |
| | | [3-(Methacryloylamino) propyl]trimethyl ammonium chloride | | | | | 100 | | |
| | | 2-(Acryloyloxy)-N,N,N-trimethylethane aminium chloride | | | | | | 100 | |
| | | 2-(Methacryloyloxy) ethyltrimethyl ammonium chloride | | | | | | | 100 |
| Polymerization initiator | | 2-Hydroxy-2-methyl-1-phenylpropanone | 50 | 50 | 50 | 50 | 50 | 50 | 50 |
| | | 1-Hydroxycyclohexyl phenyl ketone/benzophenone | | | | | | | |
| | | 1-[4-(2-Hydroxyethoxyl)-phenyl]-2-hydroxymethylpropanone | | | | | | | |
| | | Potassium persulfate | | | | | | | |
| Evaluation Durability | Initial | | ○ | ○ | ○ | ○ | ○ | ○ | ○ |
| | Detergent resistance (cation) | | x | x | ○ | ○ | ○ | ○ | ○ |
| | Detergent resistance (nonion) | | ○ | ○ | ○ | ○ | ○ | ○ | ○ |
| | Detergent resistance (anion) | | ○ | ○ | x | x | x | x | x |
| | Mineral removability | | ○ | ○ | x | x | x | x | x |

TABLE 3

| | | | Example 2- | | | | | | | | | | | | | | | | |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 |
| Silane coupling agent (S) | | 3-Methacryloxypropyltrimethoxysilane | ○ | ○ | ○ | ○ | | ○ | ○ | ○ | ○ | ○ | ○ | | ○ | | ○ | ○ |
| | | 3-Acryloxypropyltrimethoxysilane | | | | | ○ | | | | | | | ○ | | ○ | | |
| Catalyst | | 3% Hydrochloric acid | | | | | | | | | | | | | | | | |
| | | 4% Aqueous sodium hydroxide solution | | | | | | | | | | | | | | | | |
| Hydrophilic compound (A) | | Sodium vinylsulfonate | 30 | 50 | 50 | 50 | 50 | 70 | 95 | 15 | | 25 | 25 | | | | | 35 |
| | | Vinylsulfonic acid | | | | | | | | | | | | | | | | |
| | | Sodium N-t-butylacrylamide sulfonate | | | | | | | | 15 | 30 | 25 | 25 | 50 | 50 | 50 | 50 | 35 |
| | | Potassium N-t-butylacrylamide sulfonate | | | | | | | | | | | | | | | | |
| | | 2-Sodiumsulfoethyl methacrylate | | | | | | | | | | | | | | | | |
| | | Sodium allylsulfonate | | | | | | | | | | | | | | | | |
| | | Sodium p-styrenesulfonate | | | | | | | | | | | | | | | | |
| | | Sodium sulfonate-containing urethane acrylate (*1, Synthesis Example 1) | | | | | | | | | | | | | | | | |
| | | N-t-butylacrylamide sulfonic acid | | | | | | | | | | | | | | | | |
| Hydrophilic compound (B) | | (3-Acrylamidopropyl) trimethyl ammonium chloride | 70 | 50 | 50 | 50 | 50 | 30 | 5 | 70 | 70 | 50 | 50 | 50 | 50 | 50 | 50 | 30 |
| | | (3-Acrylamidopropyl) trimethyl ammonium bromide | | | | | | | | | | | | | | | | |
| | | [3-(Methacryloylamino) propyl]trimethyl ammonium chloride | | | | | | | | | | | | | | | | |
| | | 2-(Acryloyloxy)-N,N,N-trimethylethane aminium chloride | | | | | | | | | | | | | | | | |
| | | 2-(Methacryloyloxy) ethyltrimethyl ammonium chloride | | | | | | | | | | | | | | | | |
| Polymerization initiator | | 2-Hydroxy-2-methyl-1-phenylpropanone | | | | | | | | | | | | | | | | |
| | | 1-Hydroxycyclohexyl phenyl ketone/benzophenone | | | | | | | | | | | | | | | | |
| | | 1-[4-(2-Hydroxyethoxy)-phenyl]-2-hydroxymethylpropanone | | | | | | | | | | | | | | | | |
| | | Potassium persulfate | 5 | 5 | 5 | 5 | 5 | 5 | 5 | 5 | 5 | 5 | 5 | 5 | 5 | 5 | 5 | 5 |
| Evaluation | Durability | Initial | ○ | ○ | ○ | ○ | ○ | ○ | ○ | ○ | ○ | ○ | ○ | ○ | ○ | ○ | ○ | ○ |
| | | Detergent resistance (cation) | ○ | ○ | ○ | ○ | ○ | ○ | Δ | ○ | ○ | ○ | ○ | ○ | ○ | ○ | ○ | ○ |
| | | Detergent resistance (nonion) | ○ | ○ | ○ | ○ | ○ | ○ | ○ | ○ | ○ | ○ | ○ | ○ | ○ | ○ | ○ | ○ |
| | | Detergent resistance (anion) | ○ | ○ | ○ | ○ | ○ | ○ | ○ | ○ | ○ | ○ | ○ | ○ | ○ | ○ | ○ | ○ |
| | | Mineral removability | ○ | ○ | ○ | ○ | ○ | ○ | ○ | ○ | ○ | ○ | ○ | ○ | ○ | ○ | ○ | ○ |

| | | | Example 2- | | | | | | | | | | | | | | | | |
|---|---|---|---|---|---|---|---|---|---|---|---|---|---|---|---|---|---|---|---|
| | | | 17 | 18 | 19 | 20 | 21 | 22 | 23 | 24 | 25 | 26 | 27 | 28 | 29 | 30 | 31 | 32 |
| Silane coupling agent (S) | | 3-Methacryloxypropyltrimethoxysilane | ○ | ○ | ○ | ○ | ○ | ○ | ○ | ○ | ○ | ○ | ○ | ○ | ○ | ○ | ○ | ○ |
| | | 3-Acryloxypropyltrimethoxysilane | | | | | | | | | | | | | | | | |
| Catalyst | | 3% Hydrochloric acid | | | | | | | | | | | | | | | ○ | |
| | | 4% Aqueous sodium hydroxide solution | | | | | | | | | | | | | | | | ○ |
| Hydrophilic compound (A) | | Sodium vinylsulfonate | | | | 25 | 25 | 25 | 25 | 25 | 25 | 25 | 50 | 50 | 50 | 50 | 50 | 50 |
| | | Vinylsulfonic acid | | | 50 | | | | | | | | | | | | | |
| | | Sodium N-t-butylacrylamide sulfonate | 70 | 95 | | 25 | | | | | | | | | | | | |
| | | Potassium N-t-butylacrylamide sulfonate | | | | | 25 | | | | | | | | | | | |
| | | 2-Sodiumsulfoethyl methacrylate | | | | | | 25 | | | | | | | | | | |
| | | Sodium allylsulfonate | | | | | | | 25 | | | | | | | | | |
| | | Sodium p-styrenesulfonate | | | | | | | | 25 | | | | | | | | |
| | | Sodium sulfonate-containing urethane acrylate (*1, Synthesis Example 1) | | | | | | | | | 25 | | | | | | | |
| | | N-t-butylacrylamide sulfonic acid | | | | | | | | | | 25 | | | | | | |
| Hydrophilic compound (B) | | (3-Acrylamidopropyl) trimethyl ammonium chloride | 30 | 5 | 50 | 50 | 50 | 50 | 50 | 50 | 50 | 50 | | | | | 50 | 50 |
| | | (3-Acrylamidopropyl) trimethyl ammonium bromide | | | | | | | | | | | 50 | | | | | |
| | | [3-(Methacryloylamino) propyl]trimethyl ammonium chloride | | | | | | | | | | | | 50 | | | | |
| | | 2-(Acryloyloxy)-N,N,N-trimethylethane aminium chloride | | | | | | | | | | | | | 50 | | | |
| | | 2-(Methacryloyloxy) ethyltrimethyl ammonium chloride | | | | | | | | | | | | | | 50 | | |
| Polymerization initiator | | 2-Hydroxy-2-methyl-1-phenylpropanone | | | | | | | | | | | | | | | | |
| | | 1-Hydroxycyclohexyl phenyl ketone/benzophenone | | | | | | | | | | | | | | | | |
| | | 1-[4-(2-Hydroxyethoxy)-phenyl]-2-hydroxymethylpropanone | | | | | | | | | | | | | | | | |
| | | Potassium persulfate | 5 | 5 | 5 | 5 | 5 | 5 | 5 | 5 | 5 | 5 | 5 | 5 | 5 | 5 | 5 | 5 |

TABLE 3-continued

| Evaluation | Durability | | | | | | | | | | | | | | | | | |
|---|---|---|---|---|---|---|---|---|---|---|---|---|---|---|---|---|---|---|
| | | Initial | o | o | o | o | o | o | o | o | o | o | o | o | o | o | o | o |
| | | Detergent resistance (cation) | o | Δ | o | o | o | o | o | o | o | o | o | o | o | o | o | o |
| | | Detergent resistance (nonion) | o | o | o | o | o | o | o | o | o | o | o | o | o | o | o | o |
| | | Detergent resistance (anion) | o | o | o | o | o | o | o | o | o | o | o | o | o | o | o | o |
| | | Mineral removability | o | o | o | o | o | o | o | o | o | o | o | o | o | o | o | o |

TABLE 4

| | | | Comparative Example 2- | | | | | | | |
|---|---|---|---|---|---|---|---|---|---|---|
| | | | 1 | 2 | 3 | 4 | 5 | 6 | 7 | 8 |
| | Silane coupling agent (S) | 3-Methacryloxypropyltrimethoxysilane | | o | o | o | o | o | o | o |
| | | 3-Acryloxypropyltrimethoxysilane | | | | | | | | |
| | Hydrophilic compound (A) | Sodium vinylsulfonate | 50 | 100 | | | | | | |
| | | Vinylsulfonic acid | | | 100 | | | | | |
| | | Sodium N-t-butylacrylamide sulfonate | | | | 100 | | | | |
| | | Potassium N-t-butylacrylamide sulfonate | | | | | 100 | | | |
| | | 2-Sodiumsulfoethyl methacrylate | | | | | | 100 | | |
| | | Sodium allylsulfonate | | | | | | | 100 | |
| | | Sodium p-styrenesulfonate | | | | | | | | 100 |
| | | Sodium sulfonate-containing urethane acrylate (*1) | | | | | | | | |
| | | N-t-butylacrylamide sulfonic acid | | | | | | | | |
| | Hydrophilic compound (B) | (3-Acrylamidopropyl) trimethyl ammonium chloride | 50 | | | | | | | |
| | | (3-Acrylamidopropyl) trimethyl ammonium bromide | | | | | | | | |
| | | [3-(Methacryloylamino) propyl]trimethyl ammonium chloride | | | | | | | | |
| | | 2-(Acryloyloxy)-N,N,N-trimethylethane aminium chloride | | | | | | | | |
| | | 2-(Methacryloyloxy) ethyltrimethyl ammonium chloride | | | | | | | | |
| | Polymerization initiator | 2-Hydroxy-2-methyl-1-phenylpropanone | | | | | | | | |
| | | 1-Hydroxycyclohexyl phenyl ketone/benzophenone | | | | | | | | |
| | | 1-[4-(2-Hydroxyethoxyl)-phenyl]-2-hydroxymethylpropanone | | | | | | | | |
| | | Potassium persulfate | 5 | 5 | 5 | 5 | 5 | 5 | 5 | 5 |
| Evaluation | Durability | Initial | x | o | o | o | o | o | o | o |
| | | Detergent resistance (cation) | x | x | x | x | x | x | x | x |
| | | Detergent resistance (nonion) | x | o | o | o | o | o | o | o |
| | | Detergent resistance (anion) | x | o | o | o | o | o | o | o |
| | | Mineral removability | x | o | o | o | o | o | o | o |

| | | | Comparative Example 2- | | | | | | |
|---|---|---|---|---|---|---|---|---|---|
| | | | 9 | 10 | 11 | 12 | 13 | 14 | 15 |
| | Silane coupling agent (S) | 3-Methacryloxypropyltrimethoxysilane | o | o | o | o | o | o | o |
| | | 3-Acryloxypropyltrimethoxysilane | | | | | | | |
| | Hydrophilic compound (A) | Sodium vinylsulfonate | | | | | | | |
| | | Vinylsulfonic acid | | | | | | | |
| | | Sodium N-t-butylacrylamide sulfonate | | | | | | | |
| | | Potassium N-t-butylacrylamide sulfonate | | | | | | | |
| | | 2-Sodiumsulfoethyl methacrylate | | | | | | | |
| | | Sodium allylsulfonate | | | | | | | |
| | | Sodium p-styrenesulfonate | | | | | | | |
| | | Sodium sulfonate-containing urethane acrylate (*1) | 100 | | | | | | |
| | | N-t-butylacrylamide sulfonic acid | | 100 | | | | | |
| | Hydrophilic compound (B) | (3-Acrylamidopropyl) trimethyl ammonium chloride | | | 100 | | | | |
| | | (3-Acrylamidopropyl) trimethyl ammonium bromide | | | | 100 | | | |
| | | [3-(Methacryloylamino) propyl]trimethyl ammonium chloride | | | | | 100 | | |
| | | 2-(Acryloyloxy)-N,N,N-trimethylethane aminium chloride | | | | | | 100 | |
| | | 2-(Methacryloyloxy) ethyltrimethyl ammonium chloride | | | | | | | 100 |

TABLE 4-continued

| | | | | | | | | | |
|---|---|---|---|---|---|---|---|---|---|
| Polymerization initiator | 2-Hydroxy-2-methyl-1-phenylpropanone 1-Hydroxycyclohexyl phenyl ketone/benzophenone 1-[4-(2-Hydroxyethoxyl)-phenyl]-2-hydroxymethylpropanone | | | | | | | | |
| | Potassium persulfate | 5 | 5 | 5 | 5 | 5 | 5 | 5 |
| Evaluation Durability | Initial | o | o | o | o | o | o | o |
| | Detergent resistance (cation) | x | x | o | o | o | o | o |
| | Detergent resistance (nonion) | o | o | o | o | o | o | o |
| | Detergent resistance (anion) | o | o | x | x | x | x | x |
| | Mineral removability | o | o | x | x | x | x | x |

It was confirmed that good durability and mineral removability were obtained when the hydrophilic treatment compositions of Examples were used.

Comparative Examples 1-1 and 2-1 are examples in which the silane coupling agent (S) was not used. In these examples, it was confirmed that both durability and mineral removability were poor.

Comparative Examples other than those mentioned above are examples in which only one of the hydrophilic compounds (A) or (B) was used. In these examples, it was confirmed that at least one of the evaluations of the cationic detergent resistance, the anionic detergent resistance, and the mineral removability was poor.

INDUSTRIAL APPLICABILITY

The present disclosure provides a hydrophilic treatment coating composition and a hydrophilic treatment method which impart a soil guard property and are superior in durability of soil guard performance.

This application claims priority based on Japanese Patent Application No. 2020-044430, which was filed in Japan on Mar. 13, 2020, the disclosure of which application is incorporated herein by reference in its entirety.

The invention claimed is:

1. A hydrophilic treatment coating composition for an inorganic substrate surface-treated with a silane coupling agent (S), comprising:
a hydrophilic compound (A) having at least one of a sulfonic acid group and an alkali metal salt of a sulfonic acid group; and
a hydrophilic compound (B) having a quaternary ammonium cationic group,
wherein the silane coupling agent (S) has a radical reactive functional group ($R_S$), and
the compound having the quaternary ammonium cationic group further has a radical reactive functional group ($R_B$) that reacts with the silane coupling agent (S).

2. A hydrophilic treatment coating composition for an inorganic substrate, comprising:
a silane coupling agent (S);
a hydrophilic compound (A) having at least one of a sulfonic acid group and an alkali metal salt of a sulfonic acid group; and
a hydrophilic compound (B) having a quaternary ammonium cationic group,
wherein the silane coupling agent (S) has a radical reactive functional group ($R_S$), and
the compound having the quaternary ammonium cationic group further has a radical reactive functional group ($R_B$) that reacts with the silane coupling agent (S).

3. The hydrophilic treatment coating composition according to claim 1, wherein
the hydrophilic compound (A) further has a radical reactive functional group ($R_A$), and
the composition further comprises a radical polymerization initiator.

4. The hydrophilic treatment coating composition according to claim 1, wherein
the silane coupling agent (S) is a monofunctional group type silane coupling agent having one condensation type reactive functional group ($R_{S2}$),
the hydrophilic compound (A) further has a condensation type reactive functional group ($R_{A2}$), and
the hydrophilic compound (B) has a condensation type reactive functional group ($R_{B2}$).

5. The hydrophilic treatment coating composition according to claim 3, wherein at least one of the radical reactive functional groups ($R_A$) and ($R_B$) of the hydrophilic compounds is at least one group selected from the group consisting of an acrylamide group, an acryloyl group, a methacryloyl group, an allyl group, a vinyl group, a styryl group, and a mercapto group.

6. The hydrophilic treatment coating composition according to claim 1, wherein the hydrophilic compound (A) does not have any hydrophilic portion other than ends of a molecular chain.

7. The hydrophilic treatment coating composition according to claim 1, wherein the hydrophilic compound (B) does not have any hydrophilic portion other than ends of a molecular chain.

8. The hydrophilic treatment coating composition according to claim 1, wherein
the hydrophilic compound (A) has a number average molecular weight of 70 to 500, and
the hydrophilic compound (B) has a number average molecular weight of 70 to 500.

9. The hydrophilic treatment coating composition according to claim 3, wherein
an average value of the number of carbon atoms existing between the radical reactive functional group ($R_A$) and the sulfonic acid group in the hydrophilic compound (A) is expressed by ($n_1$),
an average value of the number of carbon atoms existing between the radical reactive functional group ($R_B$) and a quaternary ammonium cationic functional group in the hydrophilic compound (B) is expressed by ($n_2$), and
the ($n_1$) and the ($n_2$) have a relationship of ($n_2$)>($n_1$).

10. The hydrophilic treatment coating composition according to claim 4, wherein
an average value of the number of carbon atoms existing between the condensation type reactive functional group ($R_{A2}$) and the sulfonic acid group in the hydrophilic compound (A) is expressed by ($n_{12}$), an average value of the number of carbon atoms existing between the condensation type reactive functional group $(R_{B2})$ and a quaternary ammonium cationic functional group in the hydrophilic compound (B) is expressed by $(n_{22})$, and the $(n_{12})$ and the $(n_{22})$ have a relationship of $(n_{22}) > (n_{12})$.

11. A hydrophilic treatment coating composition set comprising:

the hydrophilic treatment coating composition according to claim 1, wherein the hydrophilic compound (A) and the hydrophilic compound (B) in the hydrophilic treatment coating composition are stored separately from each other.

12. A method of hydrophilic treatment of an inorganic substrate, the method comprising:

a step of surface-treating a surface of an inorganic substrate with a silane coupling agent (S); and a step of applying the hydrophilic treatment coating composition according to claim 1 to the inorganic substrate treated with the silane coupling agent (S), and then making the silane coupling agent (S) react with at least one of the hydrophilic compound (A) and the hydrophilic compound (B) by light or heat.

13. A method of hydrophilic treatment of an inorganic substrate, the method comprising:

subjecting the hydrophilic treatment coating composition according to claim 2 to light or heat to react the silane coupling agent (S) with at least one of the hydrophilic compound (A) and the hydrophilic compound (B), and applying the hydrophilic treatment coating composition after the reaction to a surface of an inorganic substrate.

14. A method of hydrophilic treatment of an inorganic substrate, the method comprising:

applying the hydrophilic treatment coating composition according to claim 2 to a surface of an inorganic substrate, and making the silane coupling agent (S) react with at least one of the hydrophilic compound (A) and the hydrophilic compound (B) by light irradiation or heating.

15. The method of hydrophilic treatment of an inorganic substrate according to claim 12, the method comprising making the silane coupling agent (S) react with at least one of the hydrophilic compound (A) and the hydrophilic compound (B) by light irradiation.

16. The method of hydrophilic treatment according to claim 12, wherein the inorganic substrate is a sanitary crockery.

* * * * *